United States Patent
Huang et al.

(10) Patent No.: US 11,672,040 B2
(45) Date of Patent: Jun. 6, 2023

(54) SYSTEMS AND METHODS FOR DYNAMIC INTERWORKING FUNCTION SELECTION FOR DUAL CONNECTIVITY USER EQUIPMENT

(71) Applicant: Verizon Patent and Licensing Inc., Basking Ridge, NJ (US)

(72) Inventors: Chien-Yuan Huang, Basking Ridge, NJ (US); Suzann Hua, Beverly Hills, CA (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 38 days.

(21) Appl. No.: 17/336,243

(22) Filed: Jun. 1, 2021

(65) Prior Publication Data
US 2022/0386399 A1   Dec. 1, 2022

(51) Int. Cl.
*H04W 76/15* (2018.01)
*H04W 76/12* (2018.01)
*H04W 4/029* (2018.01)
*H04W 92/02* (2009.01)

(52) U.S. Cl.
CPC ........... *H04W 76/15* (2018.02); *H04W 4/029* (2018.02); *H04W 76/12* (2018.02); *H04W 92/02* (2013.01)

(58) Field of Classification Search
None
See application file for complete search history.

(56) References Cited

U.S. PATENT DOCUMENTS

| 6,795,444 | B1* | 9/2004 | Vo | H04L 65/1101 |
| | | | | 370/466 |
| 2018/0176854 | A1* | 6/2018 | Lau | H04L 51/04 |
| 2019/0394745 | A1* | 12/2019 | Yu | H04W 76/11 |
| 2020/0228968 | A1* | 7/2020 | Bernardos | H04W 8/245 |
| 2020/0374829 | A1* | 11/2020 | Zhu | H04W 64/00 |

OTHER PUBLICATIONS

3GPP TS 23.501 V17.0.0 (Mar. 2021), "3rd Generation Partnership Project; Technical Specification Group Services and System Aspects; System architecture for the 5G System (5GS); Stage 2 (Release 17)," Mar. 2021.

(Continued)

*Primary Examiner* — German Viana Di Prisco

(57) ABSTRACT

A system described herein may provide a technique for a selection of an Interworking Function ("IWF") that facilitates an interworking between a licensed wireless network and another wireless network, such as an unlicensed wireless network, based on a geographical location of a User Equipment ("UE") that is connected to the licensed wireless network and the other wireless network. The IWF may be selected from a set of candidate IWFs based on respective locations of the candidate IWFs and the UE and/or a wireless access point associated with the other wireless network. The IWF may communicate with the UE, via the other wireless network, using one or more tunnels. The IWF may identify control plane and user plane traffic received via the tunnel(s), and may forward such communications to appropriate network devices of the licensed wireless network.

20 Claims, 12 Drawing Sheets

(56) References Cited

OTHER PUBLICATIONS

3GPP TS 23.502 V17.0.0 (Mar. 2021), "3rd Generation Partnership Project; Technical Specification Group Services and System Aspects; Procedures for the 5G System (5GS); Stage 2 (Release 17)," Mar. 2021.
ETSI TS 124 502 V15.2.0 (Apr. 2019), "5G; Access to the 3GPP 5G Core Network (5GCN) via non-3GPP access networks (3GPP TS 24.502 version 15.2.0 Release 15)," Apr. 2019.

* cited by examiner

SYSTEMS AND METHODS FOR DYNAMIC INTERWORKING FUNCTION SELECTION FOR DUAL CONNECTIVITY USER EQUIPMENT

BACKGROUND

Wireless user equipment ("UE"), such as mobile telephones or other wireless communication devices, may be capable of communicating via multiple Radio Access Technologies ("RATs"), including unlicensed RATs such as WiFi RATs and/or licensed RATs such as Long-Term Evolution ("LTE") RATs, Fifth Generation ("5G") RATs, and/or other types of licensed RATs. Some UEs with dual connectivity ("DC") capabilities may be able to simultaneously communicate via multiple RATs, such as a licensed RAT and an unlicensed RAT. Some wireless networks offer services that may be used via different types of RATs, such as voice services including Voice over WiFi ("VoWiFi") services, Voice over LTE ("VoLTE") services, Voice over New Radio ("VoNR") services, or the like.

DETAILED DESCRIPTION OF EXAMPLE EMBODIMENTS

Figure 1:
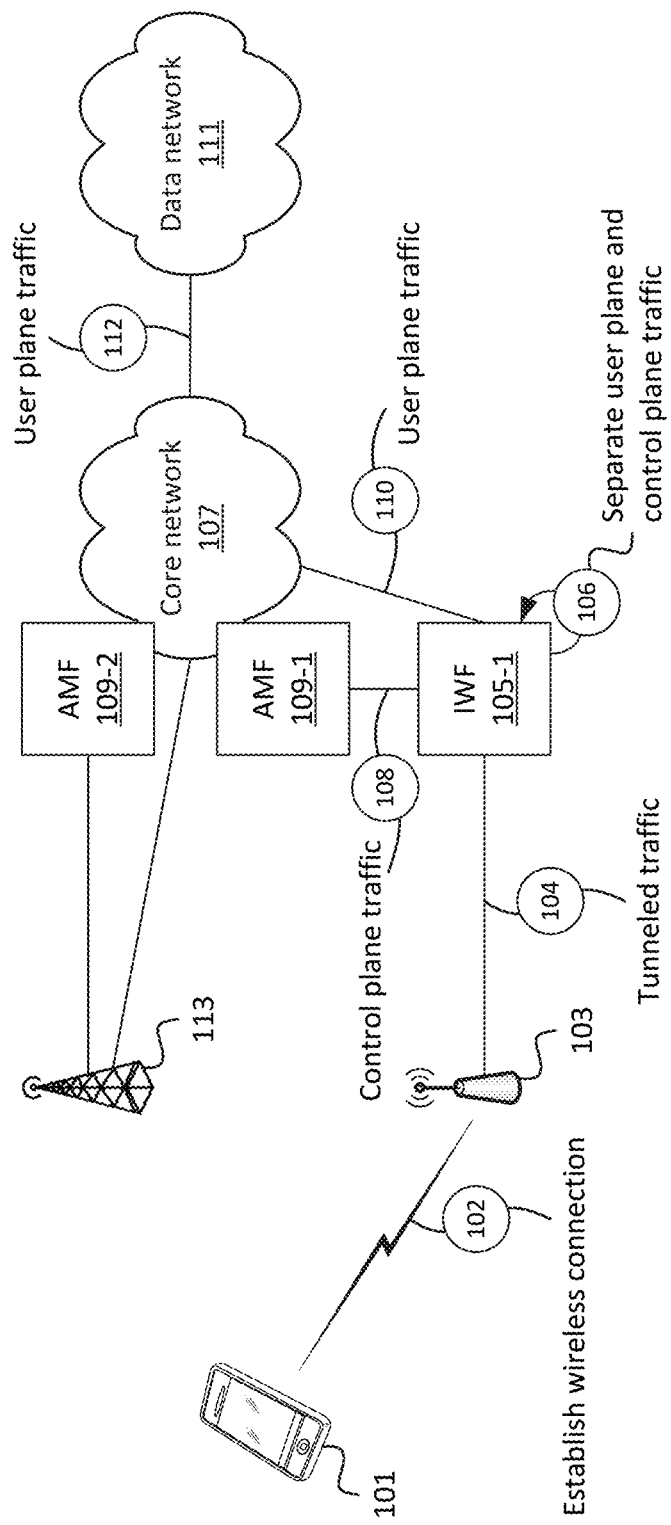
FIG. 1 illustrates an example overview of one or more embodiments described herein.

The following detailed description refers to the accompanying drawings. The same reference numbers in different drawings may identify the same or similar elements.

Some wireless networks offer services that may be used via different types of RATs, such as voice services including VoWiFi services, VoLTE services, VoNR services, or the like. UEs, such as mobile phones, tablet computers, Internet of Things ("IoT") devices, Machine-to-Machine ("M2M") devices, and/or other types of wireless devices may utilize such services when connected to a RAN of a wireless network, and/or when connected to an unlicensed wireless network, such as a WiFi network. In some situations, UEs may simultaneously send and/or receive traffic associated with a particular service via multiple RATs. For example, UE may engage in a voice call while connected to a wireless network via both a WiFi access point and a base station of a RAN of the wireless network (e.g., an evolved Node B ("eNB"), a Next Generation Node B ("gNB"), or some other type of network).

The wireless network may include and/or may be communicatively coupled to one or more interworking functions ("IWFs"), which may forward traffic from the UE to one or more elements of a core of the wireless network. Similarly, the IWF may forward traffic to the UE from the core of the wireless network. For example, the UE may be connected to an unlicensed wireless network through a wireless access point, such as a WiFi access point. The WiFi access point may be communicatively coupled, through one or more networks (such as the Internet or some other network) to one or more IWFs, which may be geographically dispersed and which may have no specific geographic relationship to the UE or the WiFi access point. For example, when a communication session between the UE and the IWF is established, the geographical locations of the UE and/or the IWF may not be a factor based on which the IWF is selected (e.g., from a pool of geographically dispersed IWFs) for the UE. Thus, the UE may be located in one geographic location (e.g., a particular city, state, province, etc.), while the IWF may be located in another geographic location (e.g., another city, state, province, etc.).

In dual connectivity scenarios, such as where the UE is also connected to a RAN of a wireless network, the UE may engage in a communication session in which licensed and unlicensed RATs may be used to send and/or receive traffic associated with the same communication session. In situations where the IWF is located relatively distant from the UE and/or from one or more elements of the RAN or core network, latency and/or jitter may be introduced due to the propagation delays of carrying traffic between the IWF and the UE (e.g., via the unlicensed RAT). These propagation delays may be greater than the propagation delays of carrying traffic between the core network and the UE via the licensed RAT.

In accordance with embodiments described herein, an IWF may be selected based on geographical location (e.g., proximity to a UE) when the UE is engaged in a dual connectivity scenario, such as when the UE is connected to a core of a wireless network via multiple RATs, such as an unlicensed RAT and a licensed RAT. For example, a UE may identify that the UE is communicatively coupled to a licensed and unlicensed RAT, and may indicate to the core network (e.g., to an access and/or mobility component, such as an Access and Mobility Management Function ("AMF")) that the UE is communicatively coupled to a licensed and unlicensed RAT. The AMF may select a different IWF for the UE based on geographical location (e.g., proximity to the UE) and/or other factors, and may cause a transfer, handover, or the like from the previously selected IWF to the IWF selected based on the geographical location of the UE. In this manner, the communications to and/or from the UE via the licensed and unlicensed RATs may be handled with less latency (e.g., less absolute latency and/or less relative latency) than in a situation where the IWF is arbitrarily selected (e.g., without taking into account the location of the UE).

As shown in FIG. 1, for example, UE 101 may be connected (at 102) to unlicensed wireless access point 103. For example, unlicensed wireless access point 103 may broadcast and/or otherwise output presence information, such as a Service Set Identifier ("SSID") broadcast or some other type of wireless signal, and UE 101 may connect to unlicensed wireless access point 103 based on detecting the presence information, performing one or more authentication procedures, or the like. UE 101 may include or execute one or more services, applications, or the like, which may direct traffic to IWF 105 (e.g., IWF 105-1, in this example). For example, UE 101 may execute a voice call application that is configured to detect when UE 101 is connected to an unlicensed network, such as a network implemented by unlicensed wireless access point 103, and to direct voice call traffic to IWF 105. For example, UE 101 (e.g., the voice call application) may direct such traffic to an Internet Protocol ("IP") address or other identifier associated with IWF 105, and one or more network elements such as routers, Domain Name System ("DNS") servers, or other suitable network elements may select a particular IWF 105 from a set of candidate IWFs 105. In the example shown here, IWF 105-1 may be the selected IWF 105. In some embodiments, IWFs 105 discussed herein may be, may include, may be communicatively coupled to, and/or may be implemented by one or more N3IWF network functions.

As noted above, the selection of a given IWF 105 (e.g., based on an IP address or other identifier provided by UE 101) may be performed independently of factors such as a geographical location of UE 101, a geographical location of unlicensed wireless access point 103, or the like. As such, situations may arise where IWF 105-1 is geographically distinct from (e.g., relatively far away from) UE 101, even if other IWFs 105 are geographically closer to UE 101.

In some embodiments, a tunnel, such as an Internet Protocol ("IP") Security ("IPSec") may be established between UE 101 and IWF 105-1 to carry (at 104) tunneled traffic between UE 101 and IWF 105-1. The tunneled traffic may include traffic associated with a particular application or set of applications of UE 101 (e.g., voice call traffic, high priority traffic, or other types of traffic). The tunneled traffic may include, for example, user plane traffic and control plane traffic. For example, the particular application or set of applications may include both user plane traffic and control plane traffic in the tunneled traffic sent (at 104) to IWF 105-1.

IWF 105-1 may separate (at 106) the user plane traffic and the control plane traffic included in tunneled traffic received (at 104) from UE 101. For example, as noted above, the traffic received from UE 101 via the tunnel may include user plane traffic control plane traffic. Such traffic may include header information, markings, labels, wrappers, or the like to indicate whether the traffic is user plane traffic or control plane traffic. Similarly, tunneled traffic received (at 104) from IWF 105-1 may include control plane traffic and user plane traffic destined for UE 101, and UE 101 may separate control plane traffic from user plane traffic and handle each respective traffic type accordingly.

For example, control plane traffic may be used to perform control signaling between UE 101 and one or more elements of core network 107, such as AMF 109, a User Plane Function ("UPF"), a Session Management Function ("SMF"), and/or one or more other elements of core network 107. The control signaling (e.g., at 108) may be used to establish one or more communication sessions (e.g., protocol data unit ("PDU") sessions or other types of communication sessions) between UE 101 and core network 107. User plane data sent (e.g., at 110) to UE 101 may include traffic to be sent to one or more particular applications of UE 101 (e.g., voice call applications or other applications). Similarly, user plane data sent (e.g., at 110) by UE 101 may include traffic to be sent (e.g., by the one or more applications) to one or more other devices or systems via core network 107 and/or data network 111 (at 112), which may include the Internet or one or more other networks.

In the manner described above, IWF 105 may provide for the interworking between an unlicensed wireless network (e.g., as implemented by unlicensed wireless access point 103) and core network 107 associated with a licensed wireless network. For example, IWF 105-1 may provide, emulate, etc. an N2 interface between unlicensed wireless access point 103 and AMF 109-1, and further may provide, emulate, etc. an N3 interface between unlicensed wireless access point 103 and one or more UPFs or other elements of core network 107. Further, IWF 105-1 may provide, emulate, etc. an N1 interface between UE 101 and AMF 109-1.

Figure 2A:
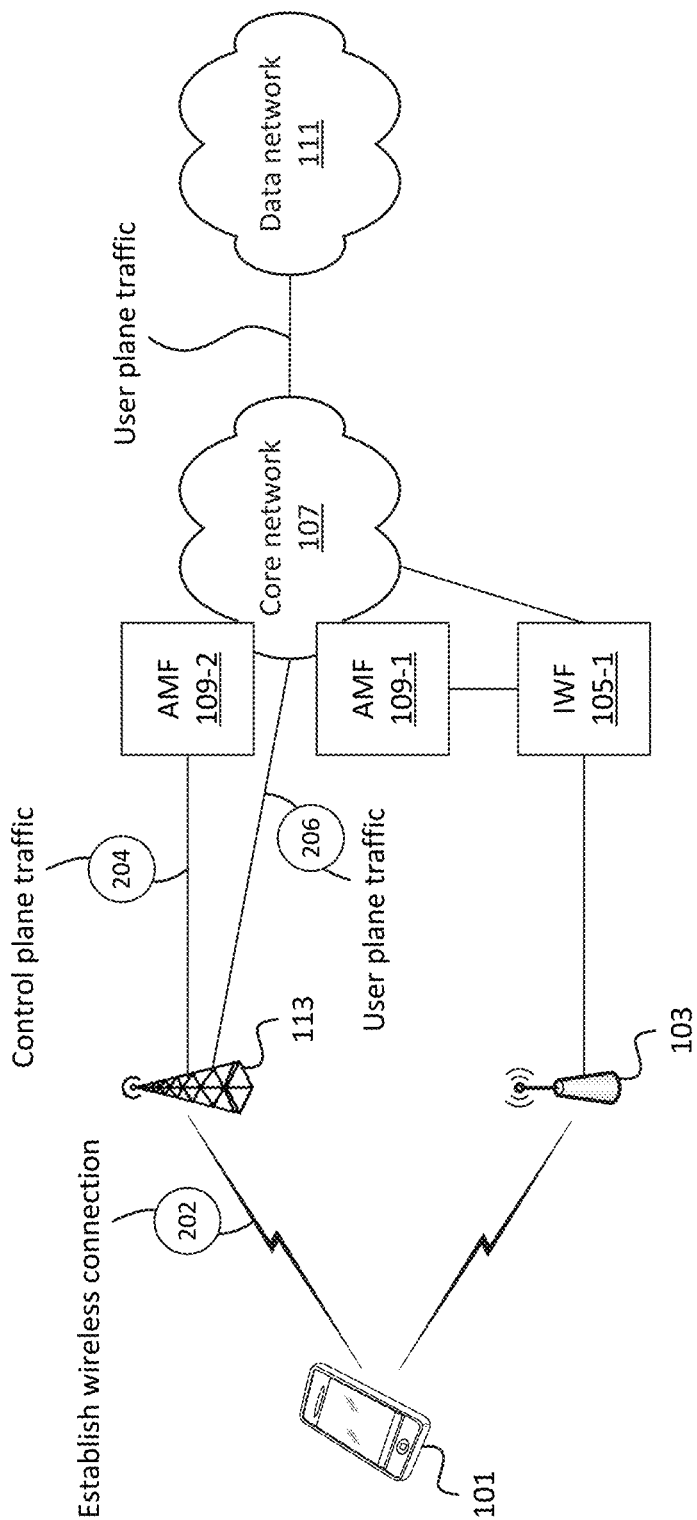
FIGS. 2A and 2B illustrate a situation where multiple data paths may be established with geographically disparate network devices in a dual connectivity scenario.

As shown in FIG. 2A, situations may arise where, after connecting (e.g., at 102) to unlicensed wireless access point 103, UE 101 may establish (at 202) a wireless connection with base station 113, which may be a base station of a RAN that is communicatively coupled to core network 107. For example, base station 113 may broadcast and/or otherwise wirelessly output presence information, such as one or more Master Information Blocks ("MIBs"), System Information Blocks ("SIBs"), or other presence information, and UE 101 may connect to base station 113 based on detecting such presence information, performing one or more authentication procedures, or the like. UE 101 may use a dual connectivity ("DC") capability to simultaneously communicate via unlicensed wireless access point 103 and base station 113 for the same application or for multiple applications. For example, the same communication session (e.g., PDU session) may be carried via both unlicensed wireless access point 103 and base station 113, and may be multiplexed, de-multiplexed, reconstructed, sequenced, etc. by UE 101 and/or one or more elements of core network 107.

Further, UE 101 may communicate (at 204) control plane traffic with AMF 109-2 via base station 113, and may communicate (at 206) user plane traffic with one or more elements of core network 107 (e.g., one or more UPFs) via base station 113. For example, base station 113 may implement an N2 interface between base station 113 and AMF 109-2, and may further implement an N3 interface between base station 113 and one or more UPFs of core network 107. Further, UE 101 and AMF 109-2 may communicate via an N1 interface.

Figure 2B:
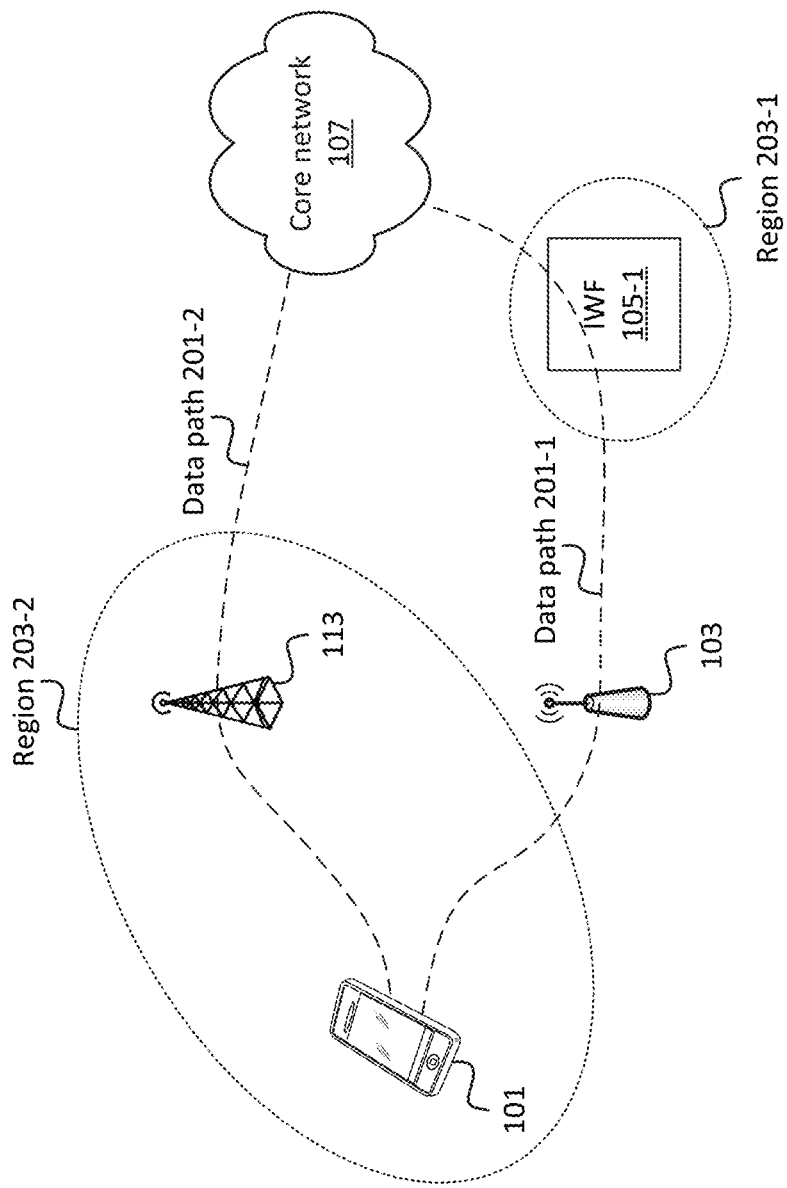

In some situations, as shown in FIG. 2B, the establishment of wireless connections between UE 101 and unlicensed wireless access point 103 (e.g., at 102) and between UE 101 and base station 113 (e.g., at 202) may lead to a situation in which separate data paths 201-1 and 201-2 are used to carry user plane traffic associated with UE 101. For example, as noted above, user plane traffic may be carried between core network 107 and UE via unlicensed wireless access point 103 (e.g., data path 201-1) and via base station 113 (e.g., data path 201-2). However, the physical distance traversed by the data may be relatively disparate. For example, as noted above, IWF 105-1 may have been selected independent of a geographical location of UE 101.

For instance, IWF 105-1 may be in a first region 203-1, while UE 101 and base station 113 may be located in a second region 203-2. In some situations, regions 203-1 and 203-2 may be relatively distant from each other, such as by hundreds or thousands of kilometers. This distance between regions 203-1 and 203-2 may cause data paths 201-1 and 201-2 to introduce differing levels of propagation delay into user traffic associated with UE 101, which may result in jitter and/or other quality issues with the traffic. Embodiments herein allow for UE 101 to be served by a different IWF 105 when UE 101 is associated with a DC capability and is connected to an unlicensed wireless network, thus reducing or eliminating the quality issues that may be introduced by data paths 201 traversing geographically distinct devices or systems (e.g., as shown in FIG. 2B).

Figure 3A:
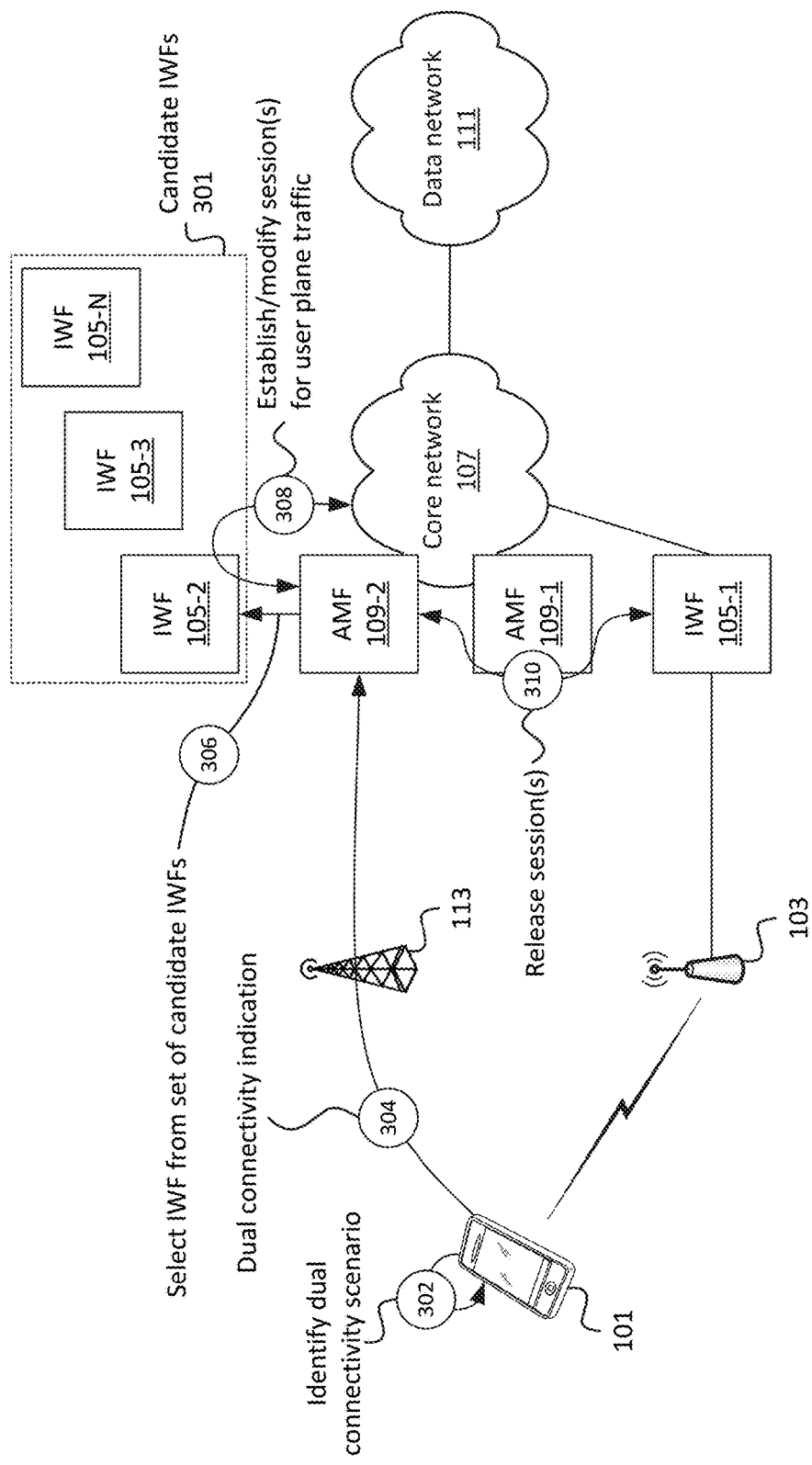
FIGS. 3A-3C illustrate an example overview of one or more embodiments described herein.

For example, as shown in FIG. 3A, UE 101 may identify (at 302) a dual connectivity scenario, in which UE 101 is connected to, or is within communications range of, an unlicensed wireless network (e.g., as implemented by unlicensed wireless access point 103) and a licensed wireless network (e.g., as implemented by base station 113). In some embodiments, the dual connectivity scenario may be a scenario in which UE 101 has previously connected to unlicensed wireless access point 103, before connecting to (or attempting to connect to) base station 113. In some embodiments, the dual connectivity scenario may include UE 101 being engaged in one or more communication sessions that involve one or more IWFs 105.

For example, in some embodiments, UE 101 may not identify a dual connectivity scenario in situations where UE 101 is previously connected to unlicensed wireless access point 103, but is not engaged in a communication session that involves IWF 105. For example, in a situation where UE 101 is engaged in a VoWiFi call (or other suitable service that involves IWF 105) via unlicensed wireless access point 103, UE 101 may identify a dual connectivity scenario when detecting the availability of a licensed wireless network implemented by base station 113. On the other hand, in a situation where UE 101 is not engaged in a VoWiFi call (or other suitable service that involves IWF 105) via unlicensed wireless access point 103, UE 101 may not identify a dual connectivity scenario when detecting the availability of a licensed wireless network implemented by base station 113. In some embodiments, UE 101 may identify a dual connectivity scenario when connected to unlicensed wireless access point 103 and subsequently detecting base station 113, regardless of active applications, traffic types, or communication sessions associated with UE 101.

Based on identifying the dual connectivity scenario, UE 101 may output (at 304) a dual connectivity indication to AMF 109-2 (e.g., via base station 113). AMF 109-2 may be, for example, an AMF that is communicatively coupled to and/or otherwise associated with base station 113. The dual connectivity indication may, in some embodiments, be provided as part of an attachment procedure, a handover procedure (e.g., from another base station or RAN to base station 113), and/or some other suitable procedure. The dual connectivity indication may indicate (e.g., to AMF 109-2) that UE 101 is associated with a dual connectivity capability and is connected to an unlicensed wireless network. The dual connectivity indication may be provided via Non-Access Stratum ("NAS") messaging between UE 101 and AMF 109-2, which may be associated with an N1 interface.

In some embodiments, the dual connectivity indication may include an identifier of IWF 105-1, such as an IP address or some other suitable identifier. Additionally, or alternatively, AMF 109-2 may obtain an identifier of IWF 105-1 from a Network Repository Function ("NRF") or other suitable device or system of core network 107, which maintains information associating UE 101 with IWF 105-1.

In some embodiments, the dual connectivity may include and/or may accompany location information associated with UE 101. The location information may identify latitude and longitude coordinates of UE 101, a network sector or tracking area ("TA") in which UE 101 is located, a cell identifier associated with base station 113, and/or other suitable location information. Additionally, or alternatively, AMF 109-2 may obtain location information associated with UE 101 and/or base station 113 from base station 113 and/or some other suitable device or system.

AMF 109-2 may further select (at 306) a particular IWF 105 from a set 301 of candidate IWFs 105. For example, as shown, set 301 may include IWFs 105-2, 105-3, and 105-N. In some embodiments, set 301 may include additional or fewer IWFs 105. IWFs 105-2, 105-3, and 105-N (as well as IWF 105-1) may be geographically dispersed, such as located in different cities, states, provinces, etc. When selecting (at 306) IWF 105-2 from set 301, AMF 109-2 may identify the geographically closest IWF 105, of set 301, to UE 101 and/or to base station 113. In some embodiments, geographical proximity may be one factor of multiple factors based on which AMF 109-2 selects (at 306) IWF 105-2. Such factors may include load and/or capacity of the IWFs 105 of set 301 (e.g., network resource load and/or capacity, processing resource load and/or capacity, memory resource load and/or capacity, etc.), a quantity of network hops between UE 101 and each respective IWF 105 of set 301, Quality of Service ("QoS") information associated with UE 101 and/or IWFs 105 (e.g., where different IWFs 105 provide different levels of QoS, and UE 101 is authorized or associated with particular QoS levels), and/or other factors.

Based on selecting (at 306) IWF 105-2, AMF 109-2 may establish and/or modify (at 308) one or more sessions (e.g., PDU sessions or other types of communication sessions) associated with UE 101 and IWF 105-1 (e.g., the particular IWF 105 with which UE 101 communicates via unlicensed wireless access point 103). For example, as discussed below in greater detail with respect to FIG. 4, AMF 109-2 may cause a UPF or other device or system of core network 107 that handles user plane traffic to communicate with UE 101 via IWF 105-2 instead of IWF 105-1. Additionally, as also described in further detail below, AMF 109-2 may communicate (at 310) with AMF 109-1 and/or IWF 105-1 to release previously established communication sessions between UE 101 and IWF 105-1, as UE 101 may communicate user plane traffic with core network 107 via IWF 105-2 in lieu of via IWF 105-1, after the communication sessions have been established (at 308) between UE 101 and IWF 105-2.

Figure 3B:
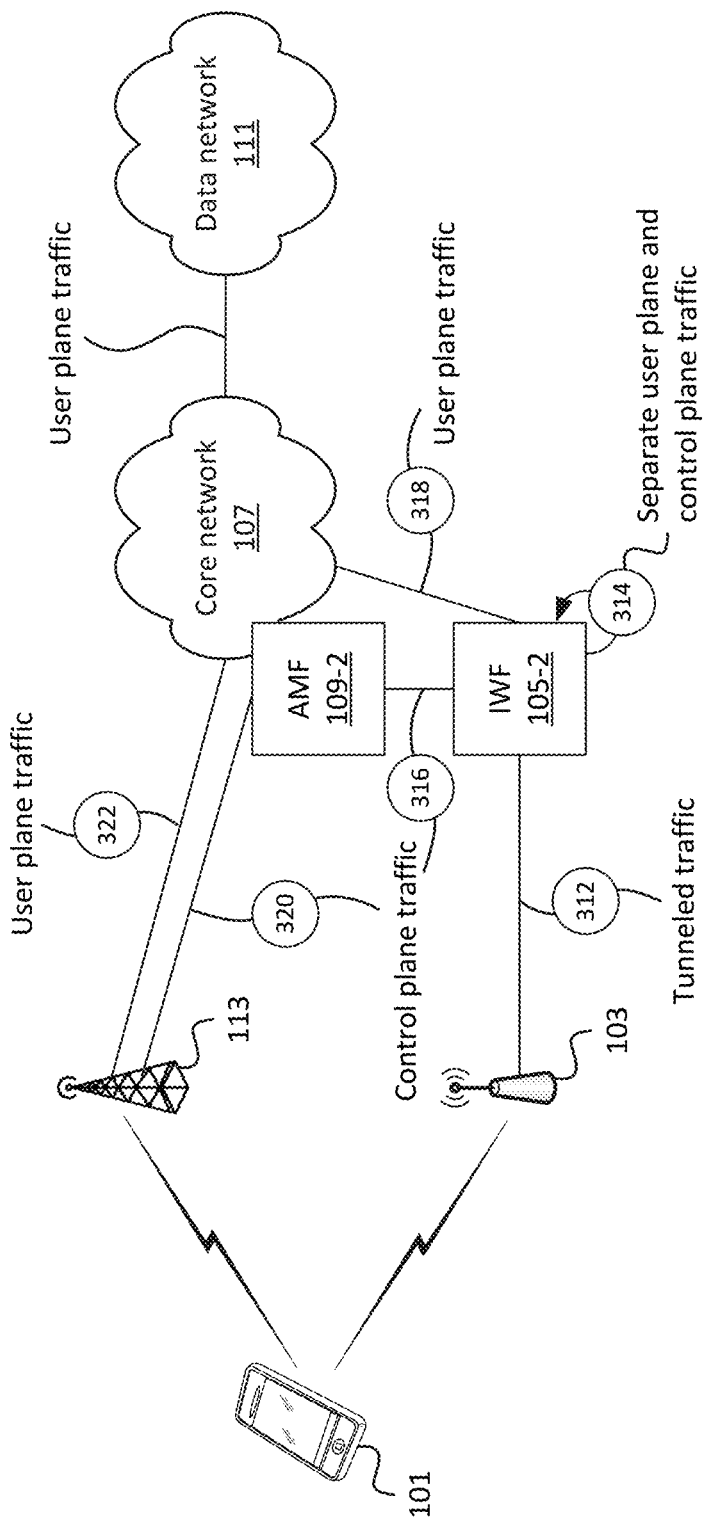

For example, as shown in FIG. 3B, once the communication sessions have been established (at 308) between UE 101 and IWF 105-2, unlicensed wireless access point 103 may carry (at 312) tunneled traffic between UE 101 and IWF 105-2. Further, IWF 105-2 may separate (at 314) user plane and control plane traffic received from UE 101 (and/or may aggregate user plane and control plane traffic received for UE 101 from AMF 109-2 and/or core network 107), output or receive (at 316) control plane traffic to and/or from AMF 109-2, and output or receive (at 318) user plane traffic to and/or from core network 107. Further, base station 113 may carry (at 320) control plane traffic between UE 101 and AMF 109-2, and user plane traffic (at 322) between UE 101 and core network 107. In this manner, the same AMF 109 may handle all control signaling associated with UE 101, and the particular IWF with which UE 101 communicates may be selected based on geographical proximity to UE 101 and/or base station 113, thus improving jitter and/or other performance or quality characteristics of traffic.

Figure 3C:
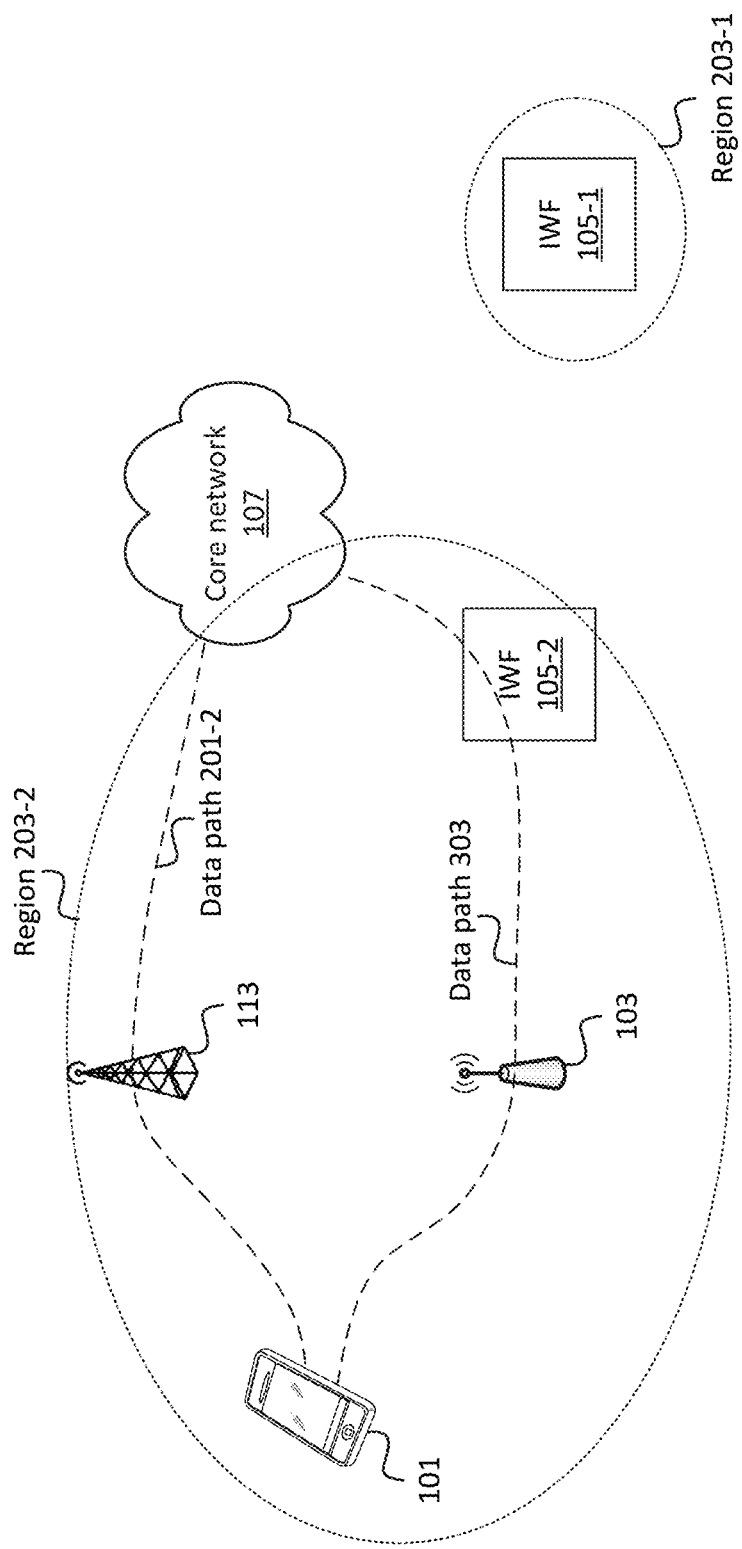

For example, as shown in FIG. 3C, data paths 201-2 (e.g., via base station 113) and 303 (e.g., via unlicensed wireless access point 103) may be established in accordance with some embodiments. As IWF 105-2 has been selected based on geographical proximity to UE 101 and/or base station 113, IWF 105-2 may be located within the same region 203-2 as UE 101 and/or base station 113, thus improving jitter and/or other performance or quality characteristics of traffic, such as traffic where different portions of a logical flow are each carried by a respective one of data path 201-2 or data path 303.

Figure 4:
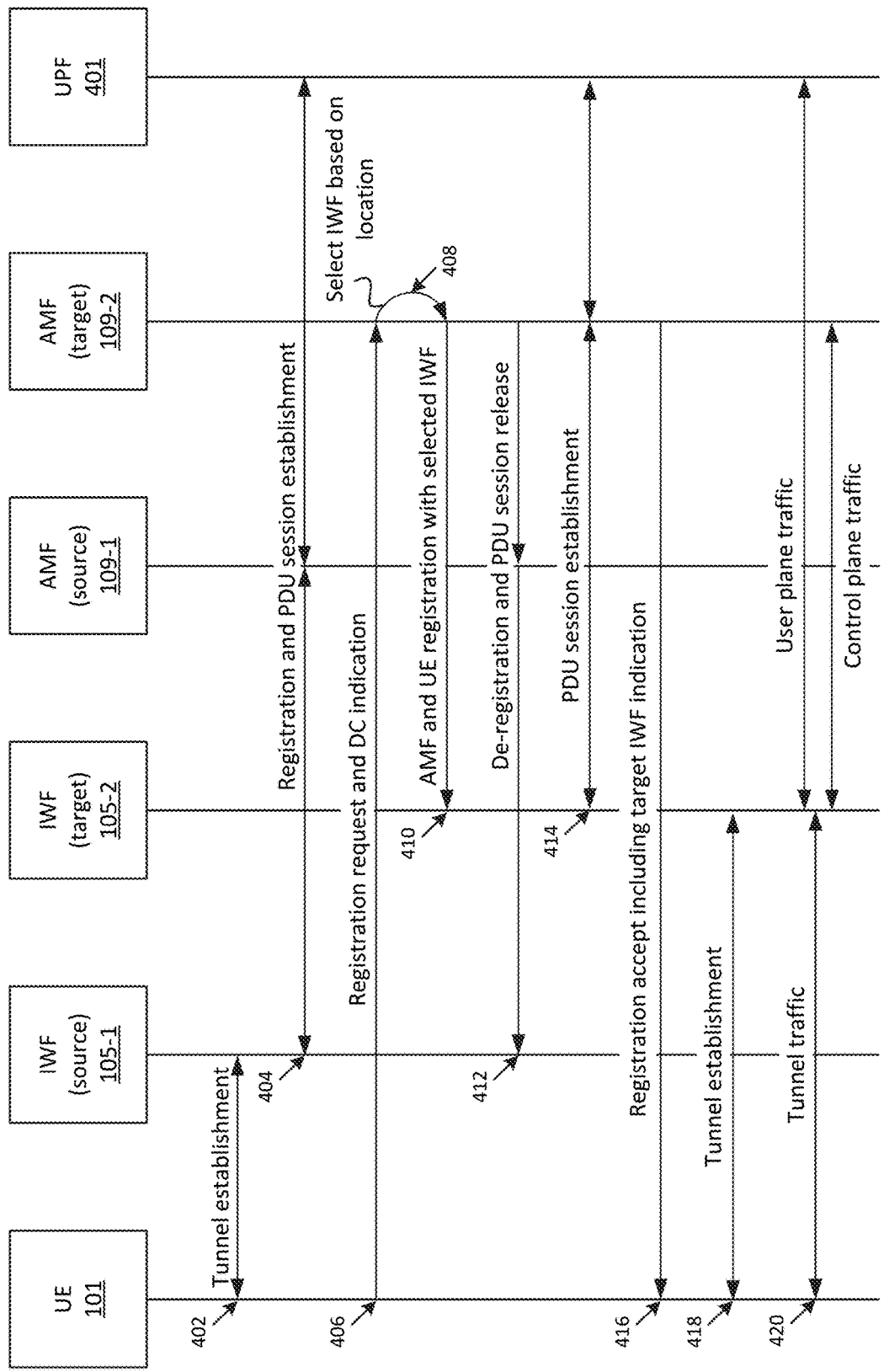
FIG. 4 illustrates an example signal flow for establishing communications with an Interworking Function ("IWF") selected based on UE location, in accordance with embodiments described herein.

FIG. 4 illustrates an example signal flow of a procedure for location-based IWF selection in a dual connectivity scenario, in accordance with some embodiments. Each signal shown in FIG. 4 may refer to multiple signals, or sets of signals, which are not necessarily described in detail for the sake of brevity. As shown, for example, UE 101 and IWF 105-1 may establish (at 402) one or more tunnels, such as an IPSec tunnel or other suitable tunnel. Referring to the examples above, UE 101 may receive wireless connectivity via one or more unlicensed networks, such as a network implemented by unlicensed wireless access point 103. As also noted above, IWF 105-1 may have been selected to serve UE 101 in a selection procedure that is independent of location-based factors, such as a location of UE 101, unlicensed wireless access point 103, and/or IWF 105-1.

Once a tunnel has been established (at 402) and/or UE 101 has otherwise been associated with IWF 105-1, then IWF 105-1, AMF 109-1, and UPF 401 may perform one or more operations to register AMF 109-1 with UE 101 and/or IWF 105-1, to establish one or more PDU sessions between IWF 105-1 and UPF 401, and/or other suitable operations. While not explicitly shown here, UE 101 may receive one or more acknowledgments or other messages based on the establishment of the PDU session, based on which UE 101 may proceed to communicate with UPF 401 via IWF 105-1.

UE 101 may further output (at 406) a registration request and dual connectivity indication to AMF 109-2. In this example, AMF 109-1 may be a "source" AMF in that UE 101 initially registers with AMF 109-1, and AMF 109-2 may be a "target" AMF in that UE 101 subsequently registers with AMF 109-2. For example, AMF 109-2 may be communicatively coupled to a base station 113 that implements a licensed wireless network to which UE 101 has connected. As noted above, the dual connectivity indication may include an indication that UE 101 is connected to an unlicensed wireless network, and/or that that UE 101 is connected to an unlicensed wireless network and is engaged in communications with or is otherwise associated with IWF 105-1 via the unlicensed wireless network.

Based on the dual connectivity indication, AMF 109-2 may select (at 408) a new IWF 105 (e.g., a "target" IWF 105) to serve UE 101, based on the location of UE 101, the location of base station 113 to which UE 101 is connected, and/or other factors. For example, as discussed above, AMF 109-2 may select the geographically closest IWF 105 to UE 101, the geographically closest IWF 105 to base station 113, and/or may otherwise use the geographical locations of UE 101, base station 113, and a set of candidate IWFs 105 to select a particular IWF (e.g., IWF 105-2, in this example) to serve UE 101.

AMF 109-2 may further indicate to AMF 109-1 and/or IWF 105-1 that AMF 109-1 no longer needs to serve UE 101 and/or that IWF 105-1 no longer needs to serve UE 101. For example, AMF 109-2 may output a de-registration message to AMF 109-1, which may issue a PDU session release message to IWF 105-1, indicating that one or more PDU sessions between IWF 105-1 and UPF 401, for UE 101, should be released.

AMF 109-2 may further cause (at 414) a PDU session establishment procedure to occur between IWF 105-2 and UPF 401, to carry user plane traffic associated with UE 101. In some embodiments, some or all of operations 414 may be performed prior to and/or concurrently with some or all of operations 412, even though operations 414 are shown as occurring subsequent to operations 412 in FIG. 4.

AMF 109-2 may further output (at 416) a registration accept message to UE 101, based on which UE 101 may perform subsequent control plane messaging (e.g., via an N1 interface, as carried by base station 113). The registration accept message may further include an indication of IWF 105-2. For example, the message may include an IP address or other identifier of IWF 105-2. The registration accept message may further include an instruction or other indication that IWF 105-2 should be used in lieu of IWF 105-1 for tunneled traffic via unlicensed wireless access point 103. Accordingly, UE 101 and IWF 105-2 may perform (at 418) a tunnel establishment procedure. Once the tunnel is established, UE 101 may send and/or receive (at 420) tunneled traffic to and/or from IWF 105-2, which may split the user plane and control plane traffic and forward such traffic to UPF 401 and AMF 109-2, as appropriate.

Figure 5:
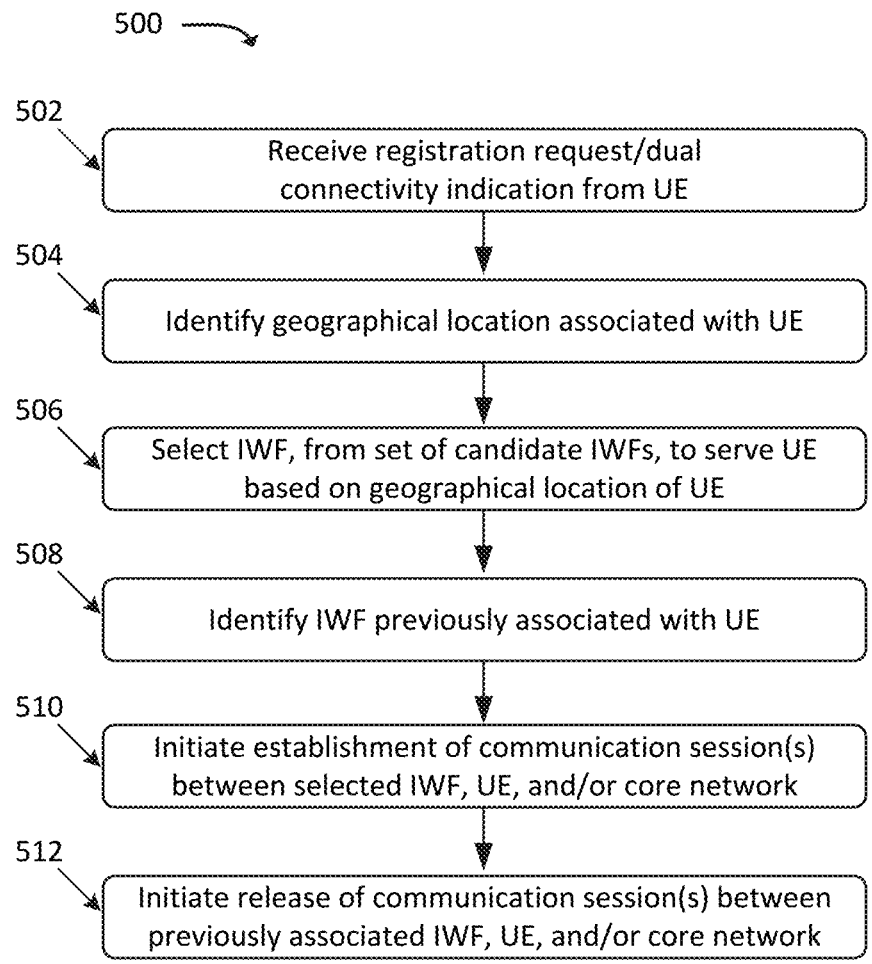
FIG. 5 illustrates an example process for establishing communications with an IWF selected based on UE location, in accordance with embodiments described herein.

FIG. 5 illustrates an example process 500 for establishing communications between UE 101, core network 107, and a particular IWF 105 based on a location of UE 101, in accordance with some embodiments. In some embodiments, some or all of process 500 may be performed by AMF 109 (e.g., a "target" AMF 109, as discussed above with respect to FIG. 4). In some embodiments, one or more other devices may perform some or all of process 500 (e.g., in concert with, and/or in lieu of, AMF 109).

As shown, process 500 may include receiving (at 502) a registration request and/or a dual connectivity indication from UE 101. For example, as discussed above, AMF 109 may receive a registration request from UE 101 based on UE 101 connecting to base station 113 that is communicatively coupled to AMF 109. Additionally, or alternatively, AMF 109 may receive a handover indication (e.g., from another AMF 109) and/or from base station 113, indicating that UE 101 has been handed over from another base station 113 or another RAN. The registration request, handover indication, etc. may include a dual connectivity indication, indicating that UE 101 is also connected to an unlicensed wireless network (e.g., a particular unlicensed wireless access point 103). Additionally, or alternatively, the dual connectivity indication may be provided to AMF 109 in addition to a registration request, handover indication, etc., and/or may otherwise be independent of a registration request, handover indication, etc. In some embodiments, the dual connectivity indication may be provided by UE 101 and/or some other source based on UE 101 being connected to unlicensed wireless access point 103 and/or associated with a particular IWF 105 (e.g., a "source" IWF, as discussed above) prior to connecting to base station 113.

Process 500 may further include identifying (at 504) a geographical location associated with UE 101. For example, the registration request, handover indication, dual connectivity indication, etc. may include information indicating a geographical location of UE 101 and/or base station 113 to which UE 101 has connected. In some embodiments, AMF 109 may determine the geographical location associated with UE 101 in some other suitable manner, such as obtaining or receiving such information base station 113, an NRF, or some other suitable device or system.

Process 500 may additionally include selecting (at 506) a particular IWF 105, from a set 301 of candidate IWFs 105, based on the geographical location associated with UE 101. For example, AMF 109 may identify a set 301 of candidate IWFs 105 which are available for provisioning, associating, etc., and may further identify geographical locations associated with such candidate IWFs 105. For example, an NRF or other suitable device or system may maintain information indicating a geographical location at which each IWF 105 is installed, a coverage area associated with each IWF 105, or the like, and AMF 109 may obtain or receive such information in order to compare the geographical location associated with UE 101 and/or base station 113 to the geographical locations associated with each IWF 105 of the set 301 of IWFs 105. In some embodiments, AMF 109 may select the closest IWF 105 to UE 101, and/or may otherwise use the geographical locations of IWFs 105, base station 113, and/or UE 101 to select a particular IWF 105 from the set 301 of IWFs 105.

Process 500 may further include identifying (at 508) an IWF 105 that has been previously associated with UE 101. In some embodiments, the dual connectivity indication (received at 502) may include an identifier of IWF 105, such as an IP address or other suitable identifier, with which UE 101 is engaged in an active communication session. Additionally, or alternatively, AMF 109 may receive or obtain such information from an NRF or other suitable device or system.

Process 500 may also include initiating (at 510) an establishment of one or more communication sessions between the selected IWF 105, UE 101, and/or core network 107. For example, as discussed above with respect to FIG. 4, AMF 109 may communicate with UPF 401 (e.g., a UPF 401 with which UE 101 is currently associated), an AMF 109 with which UE 101 is currently associated (e.g., a "source" AMF 109), and/or the particular IWF 105 with which UE 101 is currently associated (e.g., a "source IWF 105") to modify one or more sessions (e.g., PDU sessions), such that the modified sessions include communications between UPF 401, UE 101, unlicensed wireless access point 103, and/or the newly selected (at 506) IWF 105 (e.g., a "target" IWF 105) in lieu of the previously associated IWF 105 (e.g., the "source" IWF 105).

Process 500 may additionally include initiating (at 512) a release of one or more communication sessions associated with the previously associated IWF 105, UE 101, and/or core network 107. For example, as discussed above with respect to FIG. 4, AMF 109 (e.g., the "target" AMF 109) may output one or more messages, such as session release instructions, to AMF 109 with which UE 101 is previously associated (e.g., the "source" AMF 109), UPF 401, and/or IWF 105 with which UE 101 is previously associated (e.g., the "source" IWF 105). As such, resources utilized by such devices or systems to communicate with UE 101 may be released and made available to communicate with other UEs 101.

Figure 6:
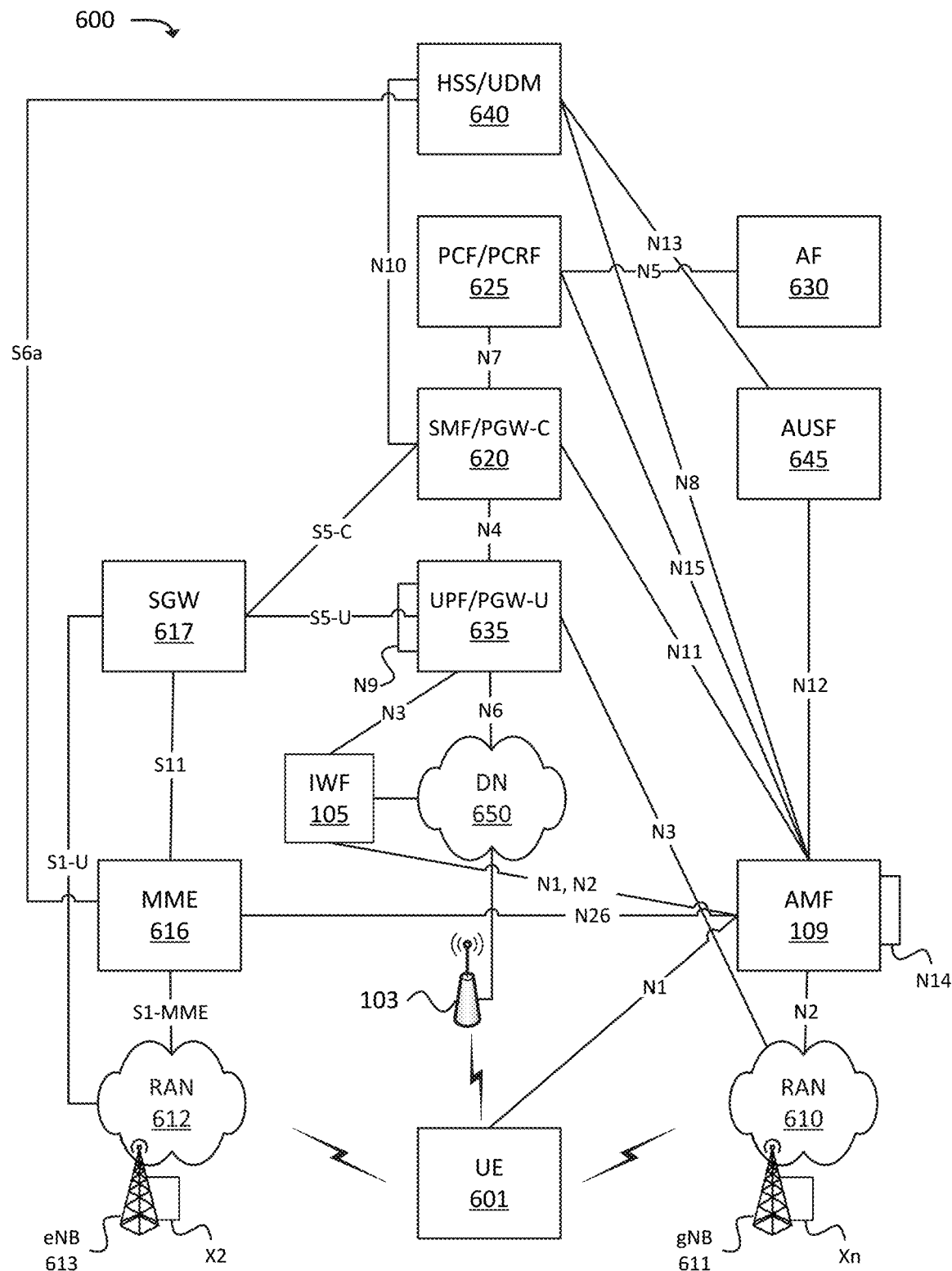
FIG. 6 illustrates an example environment in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G RAT may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). In some embodiments, core network 107 may include and/or may be communicatively coupled to some or all of the elements shown in FIG. 6.

As shown, environment 600 may include UE 101, RAN 610 (which may include one or more gNBs 611), RAN 612 (which may include one or more one or more eNBs 613), and various network functions such as Access and Mobility Management Function AMF 109, Mobility Management Entity ("MME") 616, Serving Gateway ("SGW") 617, SMF/Packet Data Network ("PDN") Gateway ("PGW")-Control plane function ("PGW-C") 620, Policy Control Function ("PCF")/Policy Charging and Rules Function ("PCRF") 625, Application Function ("AF") 630, UPF/PGW-User plane function ("PGW-U") 635, Home Subscriber Server ("HSS")/Unified Data Management ("UDM") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as unlicensed wireless access point 103 and IWF 105, which may perform one or more operations described above.

The example shown in FIG. 6 illustrates one instance of each network component or function (e.g., one instance of SMF/PGW-C 620, PCF/PCRF 625, UPF/PGW-U 635, HSS/UDM 640, and/or AUSF 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or AUSF 645, while another slice may include a second instance of SMF/PGW-C 620, PCF/PCRF 625, UPF/PGW-U 635, HSS/UDM 640, and/or AUSF 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 101 may include a computation and communication device, such as a wireless mobile communication device that is capable of communicating with RAN 610, RAN 612, and/or DN 650. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an IoT device, an M2M device, or another type of mobile computation and communication device. UE 101 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 101 may communicate with one or more other elements of environment 600. UE 101 may communicate with RAN 610 via an air interface (e.g., as provided by gNB 611). For instance, RAN 610 may receive traffic (e.g., voice call traffic, data traffic, messaging traffic, signaling traffic, etc.) from UE 101 via the air interface, and may communicate the traffic to UPF/PGW-U 635, and/or one or more other devices or networks. Similarly, RAN 610 may receive traffic intended for UE 101 (e.g., from UPF/PGW-U 635, AMF 109, and/or one or more other devices or networks) and may communicate the traffic to UE 101 via the air interface. In some embodiments, base station 113 may be, may include, and/or may be implemented by one or more gNBs 611.

RAN 612 may be, or may include, a LTE RAN that includes one or more base stations (e.g., one or more eNBs 613), via which UE 101 may communicate with one or more other elements of environment 600. UE 101 may communicate with RAN 612 via an air interface (e.g., as provided by eNB 613). For instance, RAN 610 may receive traffic (e.g., voice call traffic, data traffic, messaging traffic, signaling traffic, etc.) from UE 101 via the air interface, and may communicate the traffic to UPF/PGW-U 635, and/or one or more other devices or networks. Similarly, RAN 610 may receive traffic intended for UE 101 (e.g., from UPF/PGW-U 635, SGW 617, and/or one or more other devices or networks) and may communicate the traffic to UE 101 via the air interface. In some embodiments, base station 113 may be, may include, and/or may be implemented by one or more eNBs 613.

AMF 109 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 610 and/or gNBs 611, and/or to perform other operations. In some embodiments, the 5G network may include multiple AMFs 109, which communicate with each other via the N14 interface (denoted in FIG. 6 by the line marked "N14" originating and terminating at AMF 109).

MME 616 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate the establishment of communication sessions on behalf of UE 101. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 101, from DN 650, and may forward the user plane data toward UE 101 (e.g., via RAN 610, SMF/PGW-C 620, and/or one or more other devices). In some embodiments, multiple UPFs 635 may be deployed (e.g., in different geographical locations), and the delivery of content to UE 101 may be coordinated via the N9 interface (e.g., as denoted in FIG. 6 by the line marked "N9" originating and terminating at UPF/PGW-U 635). Similarly, UPF/PGW-U 635 may receive traffic from UE 101 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635. In some embodiments, UPF/PGW-U 635 may be, may include, and/or may be implemented by one or more UPFs 401.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 101.

DN 650 may include one or more wired and/or wireless networks. For example, DN 650 may include an IP-based PDN, a wide area network ("WAN") such as the Internet, a private enterprise network, and/or one or more other networks. UE 101 may communicate, through DN 650, with data servers, other UEs 101, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 101 may communicate.

Figure 7:
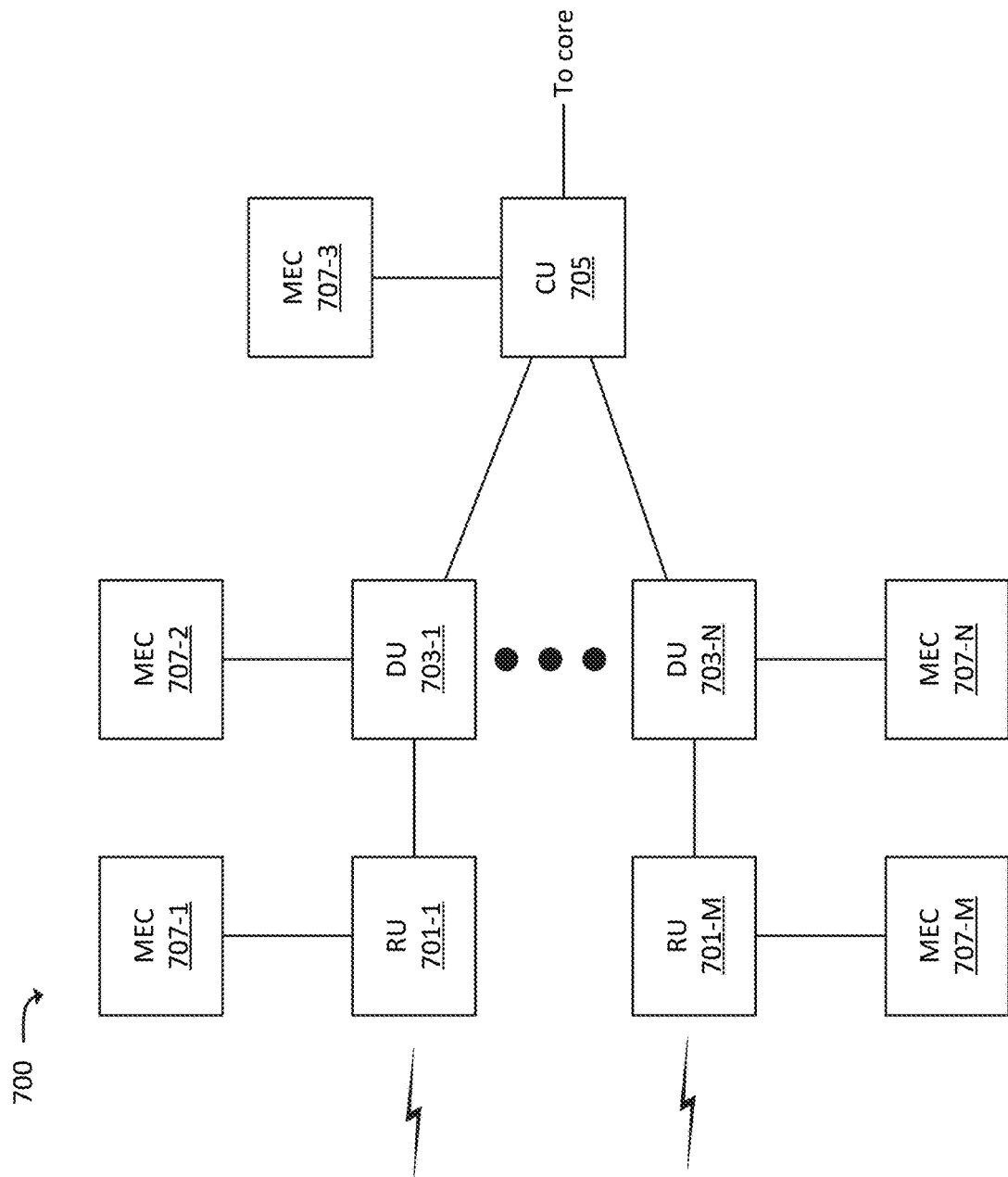
FIG. 7 illustrates an example arrangement of a radio access network ("RAN"), in accordance with some embodiments.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 109 and/or UPF/PGW-U 635). In the uplink direction (e.g., for traffic from UEs 101 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 101, and may determine which DU(s) 703 should receive the downlink traffic. DU 703 may include one or more devices that transmit traffic between a core network (e.g., via CU 705) and UE 101 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 101.

RU 701 may include hardware circuitry (e.g., one or more RF transceivers, antennas, radios, and/or other suitable hardware) to communicate wirelessly (e.g., via an RF interface) with one or more UEs 101, one or more other DUs 703 (e.g., via RUs 701 associated with DUs 703), and/or any other suitable type of device. In the uplink direction, RU 701 may receive traffic from UE 101 and/or another DU 703 via the RF interface and may provide the traffic to DU 703. In the downlink direction, RU 701 may receive traffic from DU 703, and may provide the traffic to UE 101 and/or another DU 703.

RUs 701 may, in some embodiments, be communicatively coupled to one or more Multi-Access/Mobile Edge Computing ("MEC") devices, referred to sometimes herein simply as "MECs" 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 101, via a respective RU 701.

For example, RU 701-1 may route some traffic, from UE 101, to MEC 707-1 instead of to a core network (e.g., via DU 703 and CU 705). MEC 707-1 may process the traffic, perform one or more computations based on the received traffic, and may provide traffic to UE 101 via RU 701-1. In this manner, ultra-low latency services may be provided to UE 101, as traffic does not need to traverse DU 703, CU 705, and an intervening backhaul network between DU network 700 and the core network.

Figure 8:
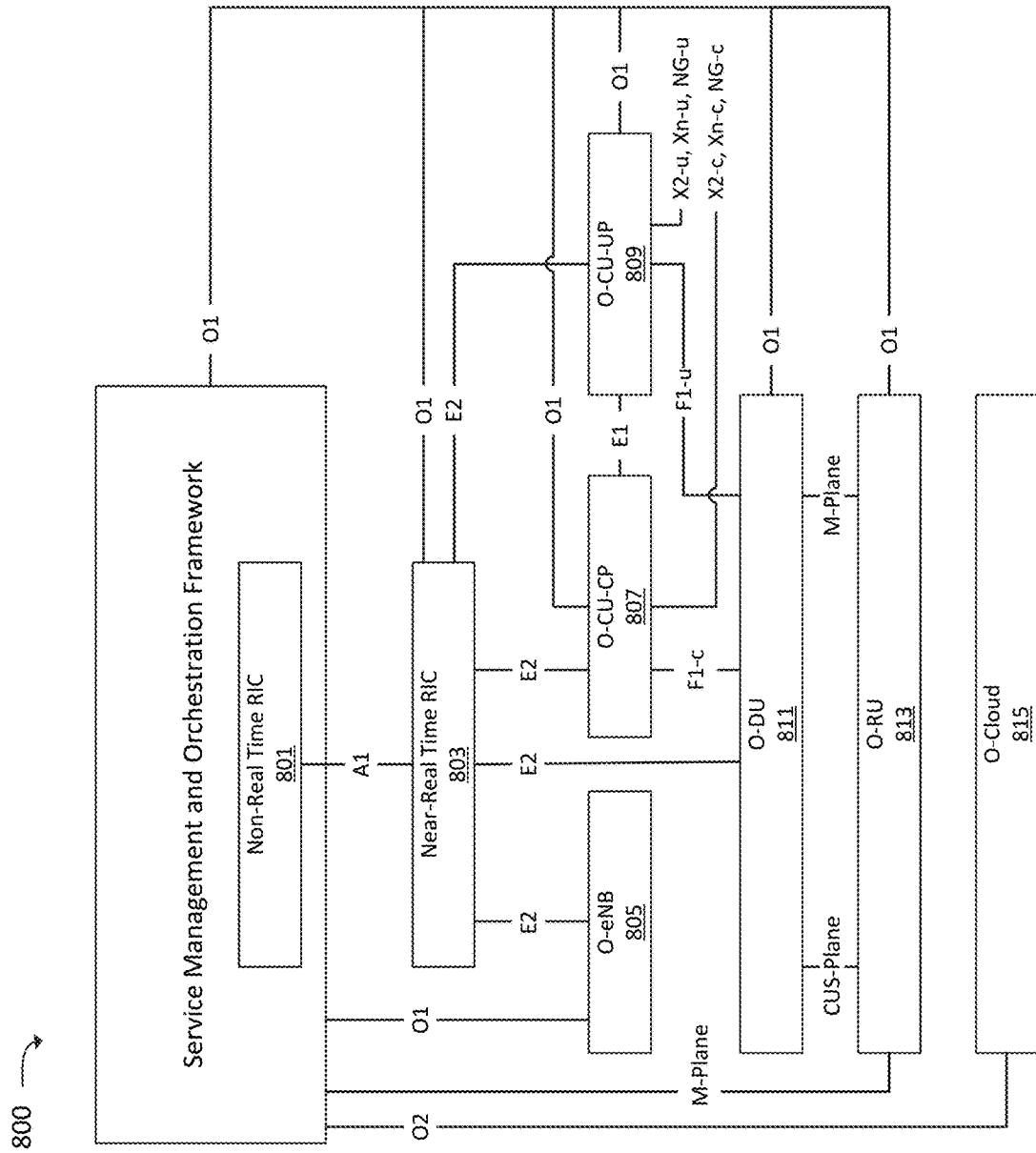
FIG. 8 illustrates an example arrangement of an Open RAN ("O-RAN") environment in which one or more embodiments, described herein, may be implemented.

FIG. 8 illustrates an example O-RAN environment 800, which may correspond to RAN 610, RAN 612, and/or DU network 700. For example, RAN 610, RAN 612, and/or DU network 700 may include one or more instances of O-RAN environment 800, and/or one or more instances of O-RAN environment 800 may implement RAN 610, RAN 612, DU network 700, and/or some portion thereof. As shown, O-RAN environment 800 may include Non-Real Time Radio Intelligent Controller ("RIC") 801, Near-Real Time RIC 803, O-eNB 805, O-CU-Control Plane ("O-CU-CP") 807, O-CU-User Plane ("O-CU-UP") 809, O-DU 811, O-RU 813, and O-Cloud 815. In some embodiments, O-RAN environment 800 may include additional, fewer, different, and/or differently arranged components.

In some embodiments, some or all of the elements of O-RAN environment 800 may be implemented by one or more configurable or provisionable resources, such as virtual machines, cloud computing systems, physical servers, and/or other types of configurable or provisionable resources. In some embodiments, some or all of O-RAN environment 800 may be implemented by, and/or communicatively coupled to, one or more MECs 707.

Non-Real Time MC 801 and Near-Real Time RIC 803 may receive performance information (and/or other types of information) from one or more sources, and may configure other elements of O-RAN environment 800 based on such performance or other information. For example, Near-Real Time RIC 803 may receive performance information, via one or more E2 interfaces, from O-eNB 805, O-CU-CP 807, and/or O-CU-UP 809, and may modify parameters associated with O-eNB 805, O-CU-CP 807, and/or O-CU-UP 809 based on such performance information. Similarly, Non-Real Time RIC 801 may receive performance information associated with O-eNB 805, O-CU-CP 807, O-CU-UP 809, and/or one or more other elements of O-RAN environment 800 and may utilize machine learning and/or other higher level computing or processing to determine modifications to the configuration of O-eNB 805, O-CU-CP 807, O-CU-UP 809, and/or other elements of O-RAN environment 800. In some embodiments, Non-Real Time RIC 801 may generate machine learning models based on performance information associated with O-RAN environment 800 or other sources, and may provide such models to Near-Real Time RIC 803 for implementation.

O-eNB 805 may perform functions similar to those described above with respect to eNB 613. For example, O-eNB 805 may facilitate wireless communications between UE 101 and a core network. O-CU-CP 807 may perform control plane signaling to coordinate the aggregation and/or distribution of traffic via one or more DUs 703, which may include and/or be implemented by one or more O-DUs 811, and O-CU-UP 809 may perform the aggregation and/or distribution of traffic via such DUs 703 (e.g., O-DUs 811). O-DU 811 may be communicatively coupled to one or more RUs 701, which may include and/or may be implemented by one or more O-RUs 813. In some embodiments, O-Cloud 815 may include or be implemented by one or more MECs 707, which may provide services, and may be communicatively coupled, to O-CU-CP 807, O-CU-UP 809, O-DU 811, and/or O-RU 813 (e.g., via an O1 and/or O2 interface).

Figure 9:
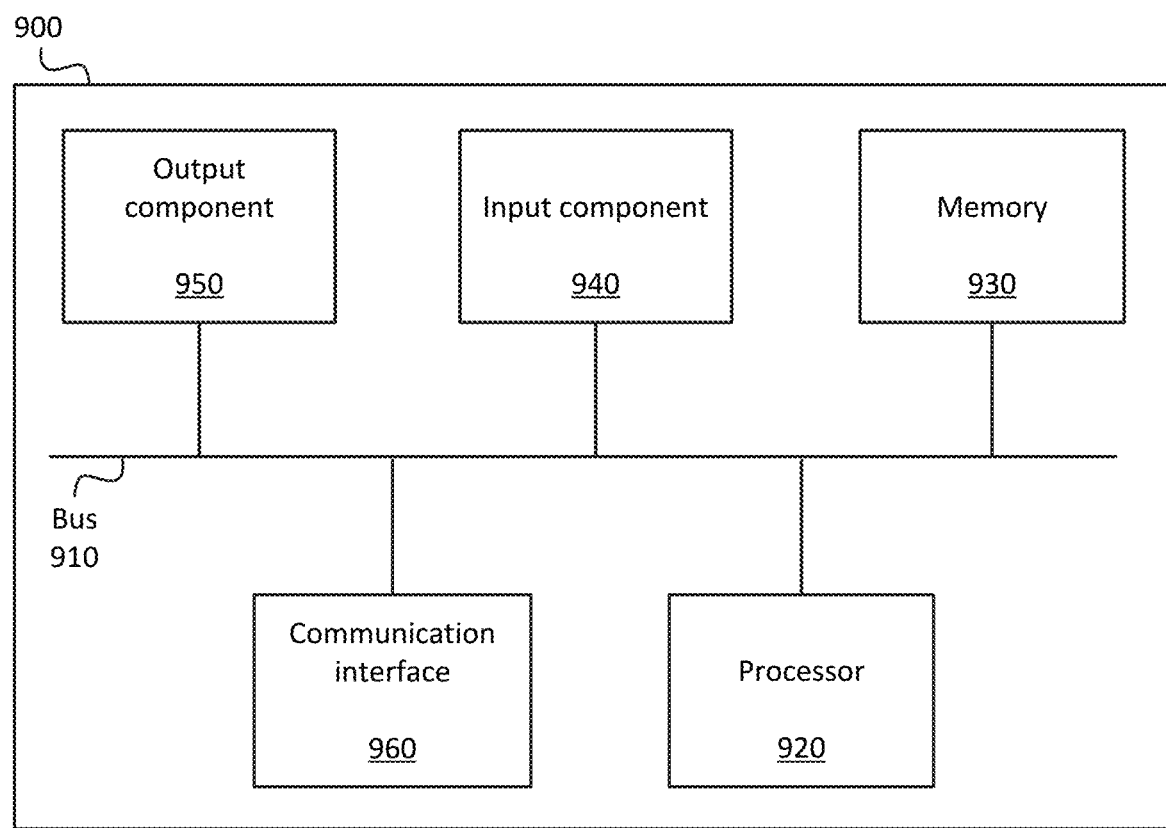
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1, 2A, 2B, 3A-3C, 4, and 5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a request from a User Equipment ("UE"), the request indicating that the UE is connected to a first wireless network;
identify, based on receiving the request, a geographical location associated with the UE;
select a particular Interworking Function ("IWF") from a set of candidate IWFs based on the geographical location associated with the UE; and
initiate an establishment of a first communication session between the selected IWF and a core network associated with a second wireless network,
wherein the selected IWF further establishes a second communication session between the UE and the IWF via the first wireless network.

2. The device of claim 1, wherein the second communication session includes a tunnel, wherein the IWF receives traffic from the UE via the tunnel, and wherein the received traffic includes control plane traffic and user plane traffic.

3. The device of claim 2, wherein the IWF forwards the control plane traffic to a first network device of the core network, and wherein the IWF forwards the user plane traffic, via the first communication session, to a second network device of the core network.

4. The device of claim 3, wherein the first network device includes an Access and Mobility Management Function ("AMF") associated with the core network.

5. The device of claim 3, wherein the second network device includes a User Plane Function ("UPF") associated with the core network.

6. The device of claim 2, wherein the tunnel includes an Internet Protocol ("IP") Security ("IPSec") tunnel.

7. The device of claim 1, wherein selecting the particular IWF from the set of candidate IWFs includes determining that the particular IWF is a geographically closest IWF, of the set of candidate IWFs, to the geographical location associated with the UE.

8. A non-transitory computer-readable medium, storing a plurality of processor-executable instructions to:
receive a request from a User Equipment ("UE"), the request indicating that the UE is connected to a first wireless network;
identify, based on receiving the request, a geographical location associated with the UE;
select a particular Interworking Function ("IWF") from a set of candidate IWFs based on the geographical location associated with the UE; and
initiate an establishment of a first communication session between the selected IWF and a core network associated with a second wireless network,
wherein the selected IWF further establishes a second communication session between the UE and the IWF via the first wireless network.

9. The non-transitory computer-readable medium of claim 8, wherein the second communication session includes a tunnel, wherein the IWF receives traffic from the UE via the tunnel, and wherein the received traffic includes control plane traffic and user plane traffic.

10. The non-transitory computer-readable medium of claim 9, wherein the IWF forwards the control plane traffic to a first network device of the core network, and wherein the IWF forwards the user plane traffic, via the first communication session, to a second network device of the core network.

11. The non-transitory computer-readable medium of claim 10, wherein the first network device includes an Access and Mobility Management Function ("AMF") associated with the core network.

12. The non-transitory computer-readable medium of claim 10, wherein the second network device includes a User Plane Function ("UPF") associated with the core network.

13. The non-transitory computer-readable medium of claim 9, wherein the tunnel includes an Internet Protocol ("IP") Security ("IPSec") tunnel.

14. The non-transitory computer-readable medium of claim 8, wherein selecting the particular IWF from the set of candidate IWFs includes determining that the particular IWF is a geographically closest IWF, of the set of candidate IWFs, to the geographical location associated with the UE.

15. A method, comprising:
receiving a request from a User Equipment ("UE"), the request indicating that the UE is connected to a first wireless network;
identifying, based on receiving the request, a geographical location associated with the UE;
selecting a particular Interworking Function ("IWF") from a set of candidate IWFs based on the geographical location associated with the UE; and
initiating an establishment of a first communication session between the selected IWF and a core network associated with a second wireless network,
wherein the selected IWF further establishes a second communication session between the UE and the IWF via the first wireless network.

16. The method of claim 15, wherein the second communication session includes a tunnel, wherein the IWF receives traffic from the UE via the tunnel, and wherein the received traffic includes control plane traffic and user plane traffic.

17. The method of claim 16, wherein the IWF forwards the control plane traffic to a first network device of the core network, and wherein the IWF forwards the user plane traffic, via the first communication session, to a second network device of the core network.

18. The method of claim 17, wherein the first network device includes an Access and Mobility Management Function ("AMF") associated with the core network, and wherein the second network device includes a User Plane Function ("UPF") associated with the core network.

19. The method of claim 16, wherein the tunnel includes an Internet Protocol ("IP") Security ("IPSec") tunnel.

20. The method of claim 15, wherein selecting the particular IWF from the set of candidate IWFs includes determining that the particular IWF is a geographically closest IWF, of the set of candidate IWFs, to the geographical location associated with the UE.

* * * * *